3,449,490
ANTIBIOTIC NOGALAMYCIN-N-OXIDE
Paul F. Wiley, Texas Township, Kalamazoo County, Mich., assignor to The Upjohn Company, Kalamazoo, Mich., a corporation of Delaware
Filed June 29, 1967, Ser. No. 649,923
Int. Cl. A61k 21/00
U.S. Cl. 424—119  2 Claims

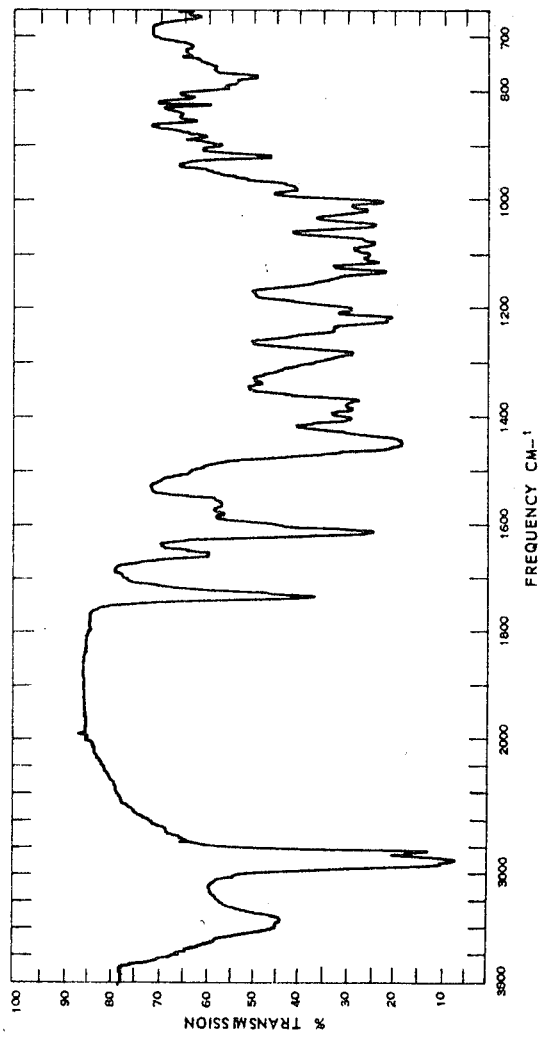

ABSTRACT OF THE DISCLOSURE

Antibiotic nogalamycin-N-oxide (U–25,795) produced by reacting the antibiotic nogalamycin with an oxidizing agent, for example, hydrogen peroxide. Nogalamycin-N-oxide can be used to inhibit the growth of various microorganisms, for example, *Bacillus subtilis*, *Staphylococcus aureus*, *Streptococcus fecalis*, and *Lactobacillus casei*.

BRIEF SUMMARY OF THE INVENTION

Nogalamycin-N-oxide is an acidic organic compound obtained by reacting the antibiotic nogalamycin with an oxidizing agent, for example, hydrogen peroxide, sodium periodate, m-chloroperbenzoic acid, and the like. The preparation and properties of nogalamycin are described in U.S. Patent 3,183,157. Nogalamycin-N-oxide has the property of adversely affecting the growth of certain organisms, particularly bacteria, for example, *Bacillus subtilis*, *Bacillus cereus*, *Sarcina lutea*, *Staphlococcus aureus*, *Streptococcus fecalis*, *Mycobacterium phelei*, *Lactobacillus casei*, *Rhodopseudomonas spheroides*, and *Propionibacterium thoni*. Further, nogalamycin-N-oxide is active against the protozoan *Crithidia fasciculata*. Nogalamycin-N-oxide can be used alone or in combination with other antibacterial agents to prevent the growth of, or reduce the number of, susceptible organisms, as disclosed above, which are present in various environments. For example, nogalamycin-N-oxide is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating papers and fabrics; and it is useful for suppressing the growth of sensitive organisms in plate assays and other microbiological media.

BRIEF DESCRIPTION OF THE DRAWING

Infrared absorption spectrum of nogalamycin-N-oxide.

DETAILED DESCRIPTION

Chemical and physical properties of nogalamycin-N-oxide

Elemental analysis.—Calc'd for $C_{39}H_{49}NO_{18}$: C, 57.13; H, 6.02; N, 1.71; O, 35.12. Found: C, 56.88; H, 6.48; N, 1.65; O, 35.16.

Equivalent weight.—Calc'd: 819.8. Found: 800.

Solubility.—Soluble in chloroform, methylene chloride, ethyl acetate, aqueous basic solutions (.01 to 5 N), strongly acidic solutions at least 5 N. Relatively insoluble in benzene, cyclohexane and higher alcohols.

Optical Rotation.—$[\alpha]_D^{25}$ +528° (c., 0.045 in chloroform).

Titration.—pK á: 9.9

Melting point.—202–206° C.

Color of crystals.—Red.

Infrared spectrum.—The infrared absorption spectrum of nogalamycin-N-oxide suspended in mineral oil mull is reproduced in the drawing. Nogalamycin-N-oxide gives bands at the following wave lengths expressed in reciprocal centimeters: 3600 (w.), 3350 (m.), 2940 (s.) (oil), 2920 (s.) (oil), 2850 (s.) (oil), 1741 (m.), 1734 (m.), 1661 (w.), 1230 (s.), 1225 (s.), 1210 (s.), 1139 (s.), 1130 (s.), 1109 (s.), 1086 (s.), 1054 (s.), 1025 (s.), 1625 (s.), 1609 (m.), 1588 (w.), 1569 (w.), 1564 (w.), 1559 (w.), 1509 (w.), 1454 (s.) (oil), 1009 (s.), 985 (m.), 975 (m.), 925 (m.), 909 (w.), 904 (w.), 889 (w.), 860 (w.), 850 (w.), 1410 (s.), 1394 (s.), 1377 (s.) (oil), 1367 (m.), 1345 (w.), 1289 (s.), 1255 (m.), 1245 (s.), 830 (w.), 815 (w.), 799 (w.), 789 (w.), 780 (w.), 760 (w.), 724 (w.), 669 (w.).

Band intensities are indicated as: "S," "M," and "W," respectively, and are approximated in terms of the backgrounds in the vicinity of the bands. An "S" band is of the same order of intensity as the strongest band; "M" bands are between one-third and two-thirds as intense as the strongest band; and "W" bands are less than one-third as intense as the strongest band. These estimates are made on the basis of a percent transmission scale.

ANTIBIOTIC ACTIVITY OF NOGALAMYCIN-N-OXIDE

The antibacterial activity of nogalamycin-N-oxide in disc-plate agar diffusion tests is given in the following table:

| Test organism: | Zone sizes, mm. |
|---|---|
| Bacillus subtilis | 17 |
| Bacillus cereus | 12 |
| Sarcina lutea | 21 |
| Staphylococcus aureus | 12 |
| Streptococcus fecalis | 12 |
| Mycobacterium phlei | 16 |
| Lactobacillus casei | 26 |
| Rhodopseudomonas spheroides | 21 |
| Propionibacterium thonii | 22 |

The above antibacterial tests were run by dipping 6-mm. filter paper discs into a 1 mg./ml. solution of nogalamycin-N-oxide in methanol (uptake about 20 microliters/disc) and placing the discs on agar plates containing a 1.3 mm. layer of agar freshly seeded with the test organism. Discs dipped in methanol alone gave no inhibition zones. The agar media used, available from the Difco Company, Detroit, Michigan, were as follows: for *B. subtilis*, streptomycin agar; for *B. cereus*, *S. aureus* and *S. lutea*, Penassay agar; for *L. casei*, thioglycolate agar; for *M. Phlei* and *S. fecalis*, brain heart infusion agar; for *R. spheroides*, 1% yeast extract agar; and for *P. thonii*, 1% yeast extract, 2% sodium lactate agar. The plates were incubated 18 to 24 hours at 37° C., except for those containing *S. lutea* which were incubated at 32° C., before reading the zones.

Nogalamycin-N-oxide also shows antiprotozoal activity. When tested by a disc-plate diffusion assay, as described above, nogalamycin-N-oxide inhibited the protozoon *Chrithidia fasciculata*. The test agar medium used contained the following ingredients/l. of medium: 10 g. of glucose monohydrate, 20 g. of Proteose peptone (Difco), 2 g. of Yeastolac (Difco), 1.2 g. of disodium hydrogen phosphate, 0.8 g. of potassium dihydrogen phosphate, 10 ml. of 2% Blood Powder Solution (Difco), and 10 ml. of Penicillin-streptomycin solution (Difco), at a pH of 7.85. The plates were incubated at 28° C. for 18 to 24 hrs. Nogalamycin-N-oxide gave a 21 mm. inhibition zone.

It has now been found that a novel compound according to this invention is obtained by reacting nogalamycin with an oxidizing agent, for example, hydrogen peroxide, sodium periodate, m-chloroperbenzoic acid, and the like. Nogalamycin, which has the empirical formula $C_{39}H_{49}NO_{17}$, is a basic compound. In the process of this invention, nogalamycin is converted to nogalamycin-N-oxide, an acidic compound. The preferred oxidizing agent is 3% hydrogen peroxide in the reaction mixture. Upon contacting nogalamycin with a solution of 3% hydrogen peroxide for about 3 days at room temperature, there is produced nogalamycin-N-oxide. The reaction can be conducted at a temperature of 0° C. to reflux. Room temperature is preferred. Nogalamycin-N-oxide is recovered from the reaction mixture conveniently by extraction procedures. For example, the reaction mixture can be extracted with chloroform and nogalamycin-N-oxide recovered from the chloroform extract by evaporation of the extract to dryness, and then dissolving the residue containing nogalamycin-N-oxide in methanol to induce crystallization of nogalamycin-N-oxide. The nogalamycin-N-oxide crystals can be recrystallized from methanol.

Nogalamycin-N-oxide also can be purified by successive transfers from ionized to non-ionized forms and vice versa, especially with other types of treatment intervening, for example, solvent extractions and washings, chromatography, and fractional-liquid extraction. In this manner metal salts of nogalamycin-N-oxides can be employed to isolate or upgrade nogalamycin-N-oxide. The antibiotic can be converted to water-soluble salts, such as the sodium or potassium, and the aqueous solutions of the salt extracted with various water-immiscible solvents before regenerating the antibiotic in its free acid form by treatment with acid of the thus-extracted basic solution.

Salts of nogalamycin-N-oxide can be used for the same biological purposes as the free acid, or they can be employed to upgrade the antibiotic as previously described.

Specific salts can be made by dissolving the free acid of nogalamycin-N-oxide in water, adding a strong base until the pH of the solution is about 10.0 to 11.0, and freeze drying the solution to provide a dried residue consisting of the nogalmacyin-N-oxide salt.

Nogalamycin-N-oxide salts which can be formed are those formed with strong bases, for example, sodium hydroxide, potassium hydroxide, lithium hydroxide, and calcium hydroxide.

Nogalamycin-N-oxide is active against *Bacillus subtilis* and can be used to minimize or prevent odor in fish and fish crates caused by this organism. The new compound can be used as a disinfectant on various dental and medical equipment contaminated with *Staphylococcus aureus*; it also can be used as a disinfectant on washed and stacked food utensils contaminated with *Staphylococcus aureus*. Nogalamycin-N-oxide also can be used for treating breeding places of silkworms to prevent or minimize infection caused by *Bacillus subtilis*. Since nogalamycin-N-oxide inhibits the growth of the protozoan *Crithidia fasciculata*, it can be used in cleaning solutions to cleanse laboratory assay plates containing this protozoan.

The following examples are illustrative of the process and products of the present invention, but are not to be construed as limiting. All percentages are by weight and all solvent mixture proportions are by volume unless otherwise noted.

Example 1

A solution of 1 g. of nogalamycin in a mixture of 30 ml. of methanol, 20 ml. of water, and 5 ml. of 30% hydrogen peroxide was allowed to stand at room temperature for 3 days. The solution was concentrated under reduced pressure until the methanol was removed. Sufficient water was added to make a volume of 25 ml. The aqueous mixture was extracted with five 10-ml. portions of chloroform. The combined chloroform extracts were evaporated to dryness under reduced pressure. The resulting residue was dissolved in 8 ml. of boiling methanol, and the solution was concentrated by boiling until crystals of nogalamycin-N-oxide began to form. Refrigeration of the mixture and filtration yielded 0.39 g. of red crystals of nogalamycin-N-oxide having a melting point of 202–206° C.

Any right, title, and interest in or to the invention described and claimed herein, or any patent which may issue thereon, shall be subject to the provisions of alternate clause 20 of HEW Contract No. PH 43–62–168.

I claim:
1. The antibiotic nogalamycin-N-oxide, a compound which
 (a) is effective in inhibiting the growth of various Gram-positive and Gram-negative bacteria;
 (b) is soluble in chloroform, methylene chloride, ethyl acetate, aqueous basic solutions in the range of .01 to 5 N, and strongly acidic solutions of at least 5 N;
 (c) has the following elemental analysis: C, 56.88; H, 6.48; N, 1.65; O, 35.16;
 (d) has an equivalent weight of 800;
 (e) has a pK á of 9.9; and
 (f) has a characteristic infrared absorption spectrum as shown in the accompanying drawing.
2. The metal salts of the compound defined in claim 1.

References Cited

UNITED STATES PATENTS 3,183,157   5/1965   Bhuyaw et al. _____ 424—120

ALBERT T. MEYERS, *Primary Examiner.*
JEROME D. GOLDBERG, *Assistant Examiner.*